Patented Sept. 19, 1950

2,522,854

UNITED STATES PATENT OFFICE 2,522,854

5,6-DIMETHYLBENZIMIDAZOLE AND ACID SALTS THEREOF

Norman G. Brink and Karl Folkers, Plainfield, N. J., assignors to Merck & Co., Inc., Rahway, N. J., a corporation of New Jersey No Drawing. Application May 26, 1949, Serial No. 95,585

6 Claims. (Cl. 260—309)

This invention relates to new chemical compounds exhibiting growth-stimulating properties and, more particularly, to 5,6-dimethylbenzimidazole, acid salts thereof, and to processes for preparing same.

This application is a continuation-in-part of our copending application Serial No. 84,726, filed March 31, 1949, now abandoned.

The new and biologically unique compound 5,6-dimethylbenzimidazole described in this invention may be represented by the formula:

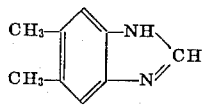

This new synthetic compound possesses the property of growth-stimulation for rats when fed to these animals. This is activity of a type corresponding to that exhibited by the animal protein factor. At present, fish meal, condensed fish solubles, liver meal, meat scraps, and other sources of substances exhibiting animal protein factor activity are finding useful application as supplements to poultry rations and hog feed, and are being sold for this purpose. 5,6-dimethylbenzimidazole and acid salts thereof may be added to commercial foodstuffs, and may also be added to the rations of animals such as swine.

While benzimidazole and several of the simple alkyl substituted benzimidazoles have been described in the literature, these compounds have never been demonstrated to have such unique biological properties as the one described herein. 5,6-dimethylbenzimidazole is a new substance characterized by an unexpected and unique physiological role in metabolism. It is well-known that the structures of such physiologically highly active substances are specific. In confirmation of this, two related benzimidazoles have been prepared and tested for animal protein factor activity in rats. At the same dosage level at which 5,6-dimethylbenzimidazole showed strong growth stimulation, 1-methylbenzimidazole and 2,5-dimethylbenzimidazole failed to increase the growth of the animals.

The fact that 5,6-dimethylbenzimidazole is formed from vitamin $B_{12}$ is further evidence of the biological uniqueness of this compound. Vitamin $B_{12}$ has a larger molecular weight than many of the common vitamins, implying that it is a conjugate or higher combination of the corresponding 5,6-dimethylbenzimidazole or one of the derivatives of the latter. That is, vitamin $B_{12}$ has the apparent properties of a coenzyme of the corresponding vitamin.

5,6-dimethylbenzimidazole is also useful in that it may be transformed to N-glycosides, as for example by reaction with halogeno-acetyl sugars.

This new substance is also a useful intermediate for the production of alkylated and aralkylated benzimidazoles which may be used as dye dispersants. In addition to the utilities described above, 5,6-dimethylbenzimidazole possesses the property of strong absorption of ultraviolet radiation in the region of 2700-2900 Å. By reason of this property the compound may be expected to find successful application in the protection of the skin from radiation and consequent erythema production.

Regarded in certain of the broader aspects, the novel features embodied in the present invention comprise the new and biologically unique compound, 5,6-dimethylbenzimidazole, acid salts thereof, and the processes of preparing the same by the condensation of 4,5-diamino-1,2-dimethylbenzene with formic acid.

It is now found that 5,6-dimethylbenzimidazole is readily prepared by heating 4,5-diamino-1,2-dimethylbenzene with formic acid. The product is then recovered by rendering the resulting solution slightly alkaline with aqueous alkali and cooling. The 5,6-dimethylbenzimidazole precipitates in crystalline form from the cooled solution and may be recovered by filtration.

Alternatively, the reaction between 4,5-diamino-1,2-dimethylbenzene and formic acid is effected in the presence of an aqueous solution of a mineral acid, hydrochloric acid being preferred. The concentration of mineral acid used is generally 4 N although some variation in concentration may be employed. Approximately equivalent amounts of 4,5-diamino-1,2-dimethylbenzene and formic acid are employed at a concentration of about 1 N for each reactant. This concentration may be varied. The temperature preferred for the reaction is that of the refluxing mixture, although variations from this temperature may be used. The isolation of 5,6-dimethylbenzimidazole from the cooled reaction mixture is accomplished by neutralizing the solution with ammonium hydroxide solution to a pH of about 7, whereupon the desired product separates in good yield as a crystalline precipitate or may be extracted with a solvent and purified. Recrystallization may be carried out in water, ether, aqueous methanol, or chloroform-ether-petroleum ether mixture as a solvent, although the preferred solvent is aqueous methanol.

The production of 5,6-dimethylbenzimidazole from vitamin $B_{12}$ by treatment with aqueous mineral acid such as hydrochloric acid may be carried out in the temperature range of about 115–180° C., the optimum temperature being about 150° C. The time interval employed may be varied between about ten and forty hours, with twenty hours an optimum. The preparation of vitamin $B_{12}$ is described in our copending applications, Serial No. 20,106, filed April 9, 1948; and Serial No. 18,854, filed April 3, 1948.

While the strength of the acid employed in this reaction may be varied from 1 N to strong concentrations, we prefer to use 6 N acid. Acids other than hydrochloric may be used, for example, sulfuric acid and the like.

Removal of extraneous products by extraction with an organic solvent such as chloroform before work-up permits the subsequent isolation of 5,6-dimethylbenzimidazole in purer form. The latter product is then removed from an alkaline aqueous solution of the hydrolysis mixture by extraction with chloroform preferably at a pH between 8 and 10. Final purification of 5,6-dimethylbenzimidazole may be conducted by recrystallization or sublimation, or both.

If desired, 5,6-dimethylbenzimidazole may be prepared by subjecting 4,5-dimethyl-2-nitroaniline to hydrogenation in the presence of a suitable catalyst such as palladium-activated carbon and the like, and by condensing the resulting 4,5-diamino-1,2-dimethylbenzene with formic acid.

In accordance with a further embodiment of this invention, it is found that 5,6-dimethylbenzimidazole forms stable acid salts which can be readily obtained in crystalline form. These salts are obtained by dissolving the 5,6-dimethylbenzimidazole in a suitable solvent such as ethanol, adding sufficient acid to about pH 2, and finally adding a sufficient quantity of a miscible solvent such as ether to hasten crystallization. After cooling the acid salt is recovered from the solution in crystalline form.

The animal tests were carried out using rats which had been given thyroid powder to retard growth, and which were maintained on a diet devoid of animal protein (cf. Emerson, G. A., Proc. Soc. Exptl. Biol. Med., 70, 392–4 (1949)). The substance to be tested for growth stimulation was fed to a group of animals in daily doses over a fifteen-day period. Average weight gains for the test groups, and for the negative control groups were noted. The results are summarized in the table. It is evident that the gain in weight of the rats fed, 5,6-dimethylbenzimidazole was about one and two-thirds that of the control groups which received no growth stimulant, and that the related 1-methyl- and 2,5-dimethylbenzimidazoles caused no growth stimulation.

TABLE
Weight gains

| Substance Tested | Daily Dose | No. of Rats | Average Gain Per Rat |
|---|---|---|---|
| | Mg. | | Grams |
| Control | | 8 | 28 |
| Do | | 10 | 30 |
| Do | | 9 | 27 |
| 5,6-Dimethylbenzimidazole | 2 | 9 | 48 |
| 1-Methylbenzimidazole | 2 | 10 | 27 |
| 2,5-Dimethylbenzimidazole | 2 | 10 | 18 |

The following examples illustrate various methods of carrying out the present invention, but it is to be understood that these examples are given by way of illustration and not of limitation.

EXAMPLE 1

Seven grams of 4,5-diamino-1,2-dimethylbenzene was refluxed with 25 ml. of 88% formic acid for two hours. The clear solution was cooled in an ice bath then neutralized and made slightly alkaline (pH 7.5 to 8.0) with 10% potassium hydroxide solution. The product, 5,6-dimethylbenzimidazole, separated in a crystalline form, and after refrigerating overnight it was filtered and dried in vacuo to yield 6.8 g. of crude 5,6-dimethylbenzimidazole melting at about 200° C. Recrystallization from methanol (after decolorizing with a small amount of norite) and petroleum ether yielded 6 g. of product melting at 204–205° C. (microblock).

EXAMPLE 2

A solution of 60 mg. of 4,5-diamino-1,2-dimethyl-benzene and 60 mg. of 98% formic acid in 3.5 ml. of 4 N hydrochloric acid was heated at the reflux temperature for two hours. The reaction mixture was cooled, filtered and neutralized to pH 7 with concentrated ammonium hydroxide solution. A crystalline precipitate of 5,6-dimethylbenzimidazole separated in excellent yield. The crystals were separated by centrifugation and dried. A portion was treated with chloroform and filtered to remove insoluble material, and the filtrate was evaporated to dryness. The residue was sublimed at 140° C. and at a pressure of 3 mm. of mercury. The sublimate was recrystallized from ether to give substantially pure 5,6-dimethylbenzimidazole, M. P. 203–205° C. In solution in 95% ethanol which was 0.01 N with respect to hydrochloric acid, this material exhibited maxima at 2745 Å. ($E_M$ 7500) and 2840 Å. ($E_M$ 8100).

EXAMPLE 3

A solution of 35 g. of 4,5-dimethyl-2-nitroaniline in 500 ml. of methanol was mixed with 3 g. of 5% palladium-Darco (activated charcoal) catalyst and hydrogenated under an initial pressure of 40 pounds of hydrogen until hydrogen uptake ceased. The catalyst was removed by filtration, and the filtrate was evaporated to dryness under reduced pressure. The resulting residue of 4,5-diamino-1,2-dimethylbenzene was dissolved in 210 ml. of 4 N hydrochloric acid. To the solution was added 13.3 ml. of 90% formic acid. The solution was maintained at the reflux temperature for forty minutes, cooled, and neutralized to pH with 6 N ammonium hydroxide. A copious crystalline deposit of 5,6-dimethylbenzimidazole separates. The product was recrystallized twice from aqueous methanol to give 20 g. of crystals which melted at about 180–200° C. (micro-block). Further amounts of crystals may be recovered from the mother liquors.

Recrystallization from chloroform-ether-petroleum ether gives crystals which melt at 205–207° C. Alternatively, recrystallization from hot water by addition of an equal volume of methanol gives crystals which melt at 206–206.5° C.

EXAMPLE 4

A sample of vitamin $B_{12}$ weighing 82 mg. was dissolved in 6 ml. of 6 N hydrochloric acid and the resulting solution was heated at 150° C. for twenty hours. The solution was cooled and filtered to remove insoluble material. The filtrate was evaporated to dryness in vacuo to remove excess hydrochloric acid. The residue was dissolved in 12 ml. of water containing 0.3 ml. of 1 N hydrochloric acid and the solution was extracted continuously with chloroform for twelve hours. The aqueous solution was then brought to pH 10 by the addition of 0.5 ml. of 2 N sodium hydroxide and extracted with fresh chloroform for twelve hours.

The chloroform solution from the extraction of the alkaline aqueous solution was concentrated to dryness and the dry residue was extracted with several portions of ether. Removal of the ether from the combined extracts yielded a basic residue, weight about 7 mg. This residue was sublimed at 140° C. and at a pressure of 3 mm. of mercury. Traces of oily material were removed from the substantially crystalline sublimate by washing with ether-petroleum ether (2:1). The crystalline sublimate, 6 ml., was recrystallized from ether to give 3.5 mg. of substantially pure 5,6-dimethylbenzimidazole, M. P. 204–205° C. A potentiometric titration of this material gave a value of 144 for equivalent weight (calcd. for $C_9H_{10}N_2$: eq. wt., 146). By analysis this material was shown to contain 74.36% C, 6.47% H, and 19.21% N, which corresponds favorably with the empirical formula $C_9H_{10}N_2$ having calculated values of 73.94% C, 6.90% H, and 19.17% N.

5,6-dimethylbenzimidazole is optically inactive. A solution of the sample described above was prepared using 95% ethanol which is 0.01 N with respect to hydrochloric acid. This solution has an ultra-violet absorption spectrum characterized by maxima at 2745 Å. ($E_M$ 7500) and 2840 Å. ($E_M$ 8100). In similar solution but in the presence of 0.01 N sodium hydroxide, the ultra-violet absorption spectrum shows maxima at 2470 Å. ($E_M$ 3900), 2775 Å. ($E_M$ 4900), 2810 Å. ($E_M$ 5250), and 2880 Å. ($E_M$ 5700).

EXAMPLE 5

One gram of 5,6-dimethylbenzimidazole was dissolved in 25 ml. of warm ethanol, cooled, then acidified with concentrated hydrochloric acid dropwise to a pH of 2.0. Crystallization was hastened by the addition of a little ethyl ether. After refrigeration, 243 mg. of white crystals of 5,6-dimethylbenzimidazole hydrochloride was obtained. These crystals do not melt on heating to 320° C.

In another experiment 0.5 g. of 5,6-dimethylbenzimidazole in 15 ml. of ethanol was acidified with alcoholic hydrogen chloride to a pH of 2.0, then treated dropwise with ethyl ether to hasten crystallization. Refrigeration then filtration yielded 0.43 g. of white crystals of the hydrochloride salt that do not melt up to 320° C. The product recrystallizes easily from ethanol.

EXAMPLE 6

One half gram of 5,6-dimethylbenzimidazole in 15 ml. ethanol was acidified with alcoholic sulfuric acid (prepared by mixing 15 ml. ethanol with 2 ml. of concentrated sulfuric acid) to a pH of 2.0. Crystals readily separated on the addition of a little ethyl ether. After refrigeration, filtration yielded 439 mg. of white crystals of dimethylbenzimidazole sulfate, M. P. 255–260° C. Recrystallization from ethanol with ethyl ether yielded a product melting at 267–268° C.

EXAMPLE 7

One half gram of 5,6-dimethylbenzimidazole in 15 ml. ethanol was acidified with alcoholic hydrobromic acid (prepared by mixing 15 ml. of ethanol with 5 ml. of 40% hydrobromic acid) to a pH of 2.0, then treated dropwise with ethyl ether to hasten crystallization. After refrigeration, filtration yielded 137 mg. of white crystals of 5,6-dimethylbenzimidazole hydrobromide on heating that do not melt up to 320° C. The product recrystallizes easily from ethanol with ethyl ether.

Various changes and modifications may be made in our improved process as herein described, without departing from our invention. To the extent that these changes and modifications are comprehended within the scope of the appended claims, they are to be considered as within the purview of our invention.

We claim:
1. A compound selected from the group consisting of 5,6-dimethylbenzimidazole and acid salts thereof.
2. 5,6-dimethylbenzimidazole.
3. Acid salts of 5,6-dimethylbenzimidazole.
4. 5,6-dimethylbenzimidazole hydrochloride.
5. 5,6-dimethylbenzimidazole hydrobromide.
6. 5,6-dimethylbenzimidazole sulfate.

NORMAN G. BRINK.
KARL FOLKERS.

REFERENCES CITED

The following references are of record in the file of this patent:

Beilstein, Handbuch der organischen Chemie, vol. 13 (4th ed.), p. 179 (1936).

Beilstein, Handbuch der organischen Chemie, vol. 23, p. 165.